United States Patent [19]

Hutch

[11] Patent Number: 4,891,807
[45] Date of Patent: Jan. 2, 1990

[54] MULTIPLEXER WITH LEAKAGE CURRENT COMPENSATION

[76] Inventor: Frederick S. Hutch, c/o Honeywell Inc., Legal Dept., 1100 Virginia Dr., Fort Washington, Pa. 19034

[21] Appl. No.: 319,213

[22] Filed: Mar. 6, 1989

[51] Int. Cl.[4] .............................................. H04J 3/00
[52] U.S. Cl. ..................................... 370/112; 307/243; 328/104
[58] Field of Search ................ 370/112; 307/243, 244; 328/104, 105, 137, 154

[56] References Cited

U.S. PATENT DOCUMENTS

| | | | |
|---|---|---|---|
| 3,922,641 | 11/1975 | Gates, Jr. | 328/154 |
| 4,446,390 | 5/1984 | Alaspa | 307/243 |
| 4,544,854 | 10/1985 | Ulmer et al. | 307/243 |

Primary Examiner—Robert L. Griffin
Assistant Examiner—Min Jung
Attorney, Agent, or Firm—Mitchell J. Halista; Albin Medved

[57] ABSTRACT

A multiplexer having a plurality of semiconductor solid state input switches arranged to be connected to respective input signal sources and arranged in groups of input switches with a plurality of the switches in each group, a plurality of selectable leakage current shunting circuits with each circuit being connected by a leakage current control switch to a respective one of the groups of the switches to provide a shunt path for leakage currents through the switches in a corresponding group and a switch control for selectively operating the solid-state switches to connect a selected one of the input signal sources in a selected one of the groups of sources to an output of the multiplexer and the leakage current switches in the non-selected groups to connect each of the solid-state input switches in the non-selected groups to the respective ones of the current shunting circuits.

6 Claims, 2 Drawing Sheets

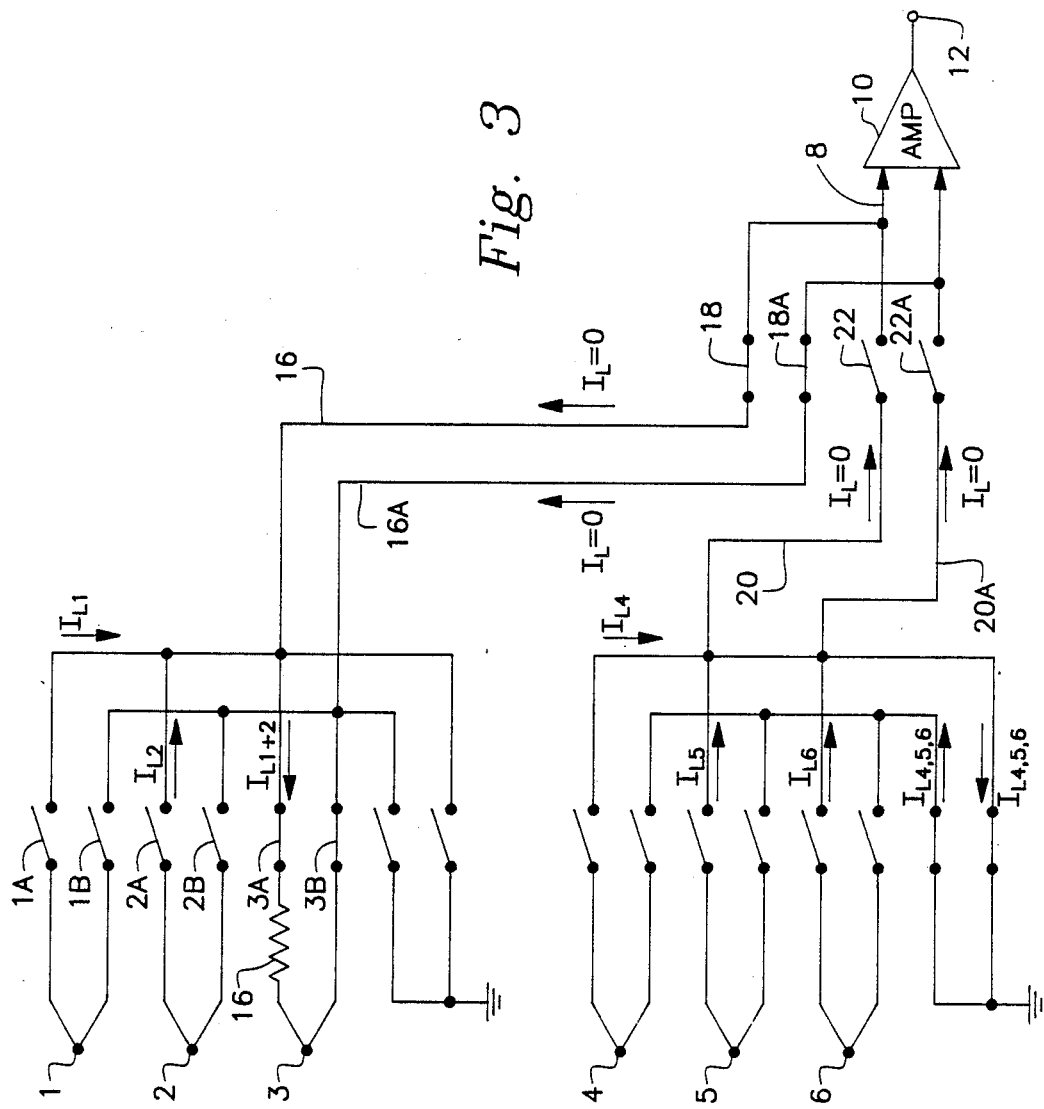

MULTIPLEXER WITH LEAKAGE CURRENT COMPENSATION

BACKGROUND OF THE INVENTION

Field of the Invention

The present invention relates to signal multiplexers. More specifically, the present invention is directed to signal multiplexers using semiconductor or solid state switches.

SUMMARY OF THE INVENTION

An object of the present invention is to provide an improved signal multiplexer using solid state switches.

In accomplishing this and other objects, there has been provided, in accordance with the present invention a signal multiplexer having a plurality of solid-state input switches arranged to be connected to respective input signal sources and arranged in groups of switches with a plurality of the switches in each group, a plurality of selectable leakage current shunting circuits with each circuit being connected by a leakage current control switch to a respective one of the groups of the switches to provide a shunt path for leakage currents through the input switches in a corresponding group and a switch control for selectively operating the solid-state switches to connect a selected one of the sources in a selected one of the groups of sources to an output of the multiplexer and the leakage current switches in the non-selected groups to connect each of the solid-state switches in the non-selected groups to the respective ones of the current shunting circuits.

BRIEF DESCRIPTION OF THE DRAWINGS

A better understanding of the present invention may be had when the following detailed description is read in connection with the accompanying drawings, in which:

FIG. 2 is a schematic illustration of a multiplexer circuit embodying an example of a first embodiment of the present invention for a single-ended output and FIG. 3 is a schematic illustration of a multiplexer circuit embodying an example of a second embodiment of the present invention for a differential output.

DESCRIPTION OF THE PREFERRED EMBODIMENT

Figure 1:
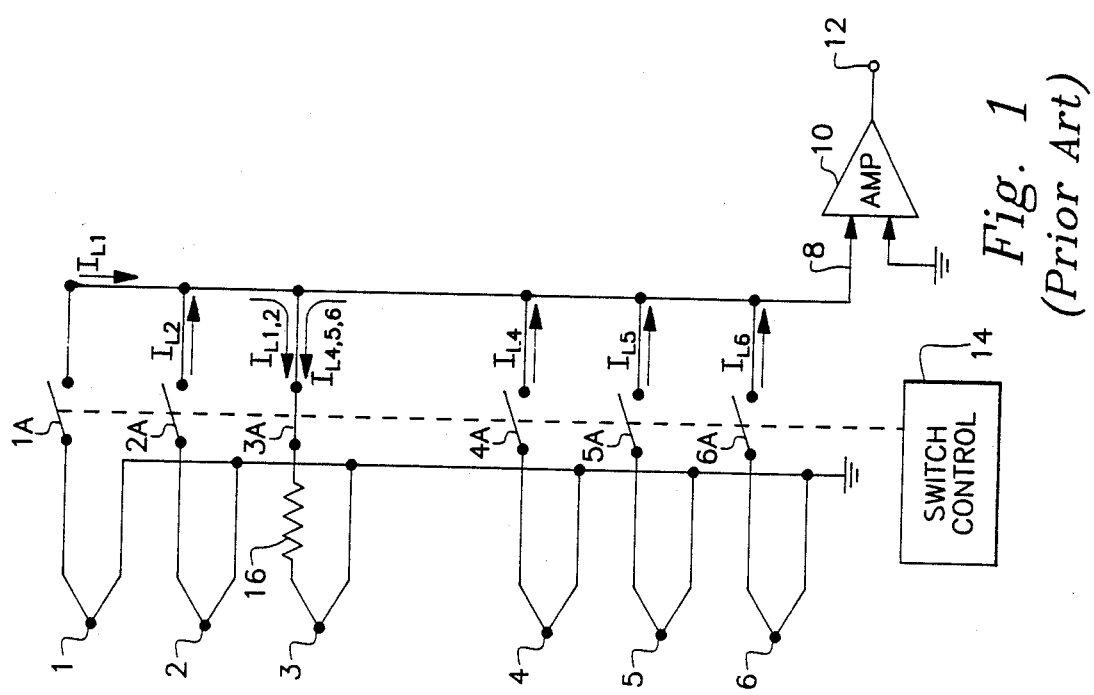
FIG. 1 is a schematic illustration of a prior art multiplexer circuit for selectively connecting each of a plurality of input signal sources to a multiplexer output.

Referring to FIG. 1 in more detail, there is shown a prior art multiplexer circuit wherein a plurality of signal sources, e.g., thermocouples 1, 2, 3, 4, 5 and 6, are to be selectively connected to an output line 8 of the multiplexer for amplification by an amplifier 10. The output of the amplifier 10 is connected to an output terminal 12 used as an output of the multiplexer to provide an amplified version of the selected input signal source signal. One side of each of the signal sources is connected through a single pole-single through switch to the output line 8. For example, one side of thermocouple 1 is connected through switch 1A to the output line 8; thermocouple 2 has one side connected through switch 2A to the output line 8, and one side of thermocouple 3 is connected through switch 3A to the output line 8. The other sides of all of the thermocouples 1, 2, and 3 are connected to a ground connection. Switches 1A and 2A are shown in an open state while switch 3A is shown in a closed state indicating a selection of the signal from the input source 3. A switch control 14 is used to operate the switches 1A, 2A and 3A to select a thermocouple for a readout operation through the multiplexer to the output 12. A similar arrangement is provided for the thermocouples 4, 5 and 6.

Conventionally, the switches 1A, 2A and 3A, etc. are mechanical switches having a virtually infinite open or non-selected condition resistance. However, in order to develop a multiplexer for use with so-called solid state circuitry or for integration onto a printed circuit board it is desirable to use semiconductor or solid state switches. Use of such semiconductor switches as signal switches is well-known in the art as shown in U. S. Pat. No. 3,728,691. However, such semiconductor switches have an inherent shortcoming in that they do not provide a virtually infinite resistance in their open or non-selected state, and, consequently, a high leakage current is present during a non-selected state in circuits using such solid state switches.

In the illustration shown in FIG. 1, the selection of the thermocouple input source 3 by a closure of the switch 3A by the switch control 14 is effective to provide a leakage path for all the leakage currents from the sources 1, 2, 3, 4, 5 and 6. These leakage currents designated as $I_{L1}$, $I_{L2}$, $I_{L4}$, $I_{L5}$ and $I_{L6}$ are generated by the active state of the unselected input signal sources and are routed by the common output line 8 and the closed switch 3A through the source impedance 16 of the selected thermocouple input source 3. If each of the open semiconductor switches 1A,2A,4A,5A,6A has a leakage current of 10 nanoamps, then the source impedance 16 has a leakage current of 50 nanoamps flowing therein. Of course, if more input sources are connected to the multiplexer for selection, then each would contribute an additional leakage current to be applied through the source impedance 16. Assuming a source impedance of 1000 ohms, the 50 nanoamps, which is 0.05 microamps, produces a 50 microvolt error signal which can be analogized to an excessive 2.5° F. error in the temperature measurement of a thermocouple selected by the multiplexer resulting in unusable thermocouple output signals.

Figure 2:
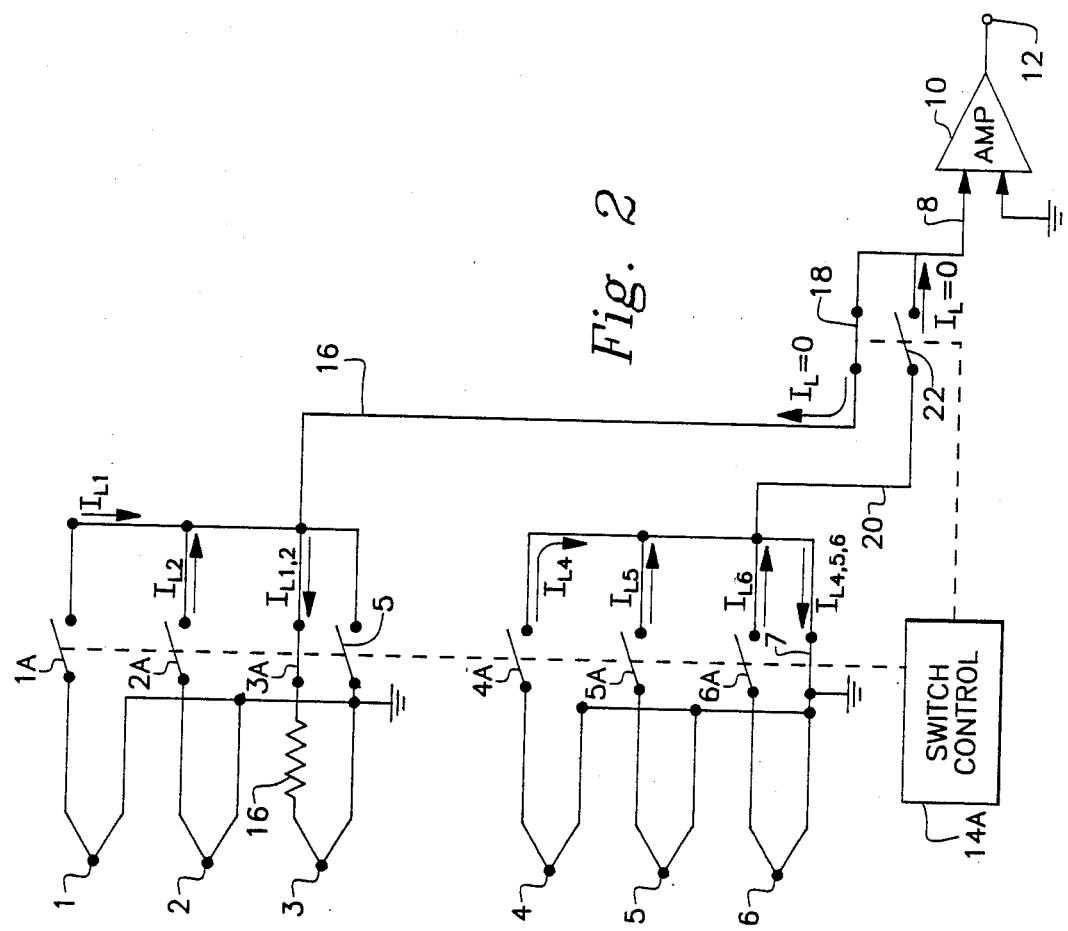

In FIG. 2, there is shown a first embodiment of the present invention for controlling the leakage current of the multiplexer to significantly reduce the input source error produced by the leakage current. In FIG. 2, the same numbers are used to refer to elements common to FIGS. 1 and 2. As shown in FIG. 2, the input signal sources, e.g., thermocouples 1, 2, 3, 4, 5 and 6 are grouped in preselected groups, e.g., three sources per group. Each group is provided with a leakage current shunting circuit including a separate semiconductor switch for controlling the shunting of the leakage current of its corresponding group. For example, a first group of thermocouples 1, 2, and 3 is provided with a separate leakage current control switch 5 connected between the output line 8 and the ground connection of each of the first group thermocouples 1, 2 and 3. Similarly, the second group of thermocouples 4, 5 and 6 is provided with a leakage current control switch 7 connected between the output line 8 and the circuit ground of the thermocouples 4, 5 and 6. The switches 5 and 7 are also controlled by a suitable switch control 14A.

Additionally, each of the groups of thermocouples is connected to an output line which is connected through a respective semiconductor switch to the output line 8 of the multiplexer. Thus, the first group of thermocouples 1, 2 and 3 is connected to an intermediate output line 16 which is connected through a semiconductor switch 18 to the output line 8. The second group of thermocouples 4, 5 and 6 is connected through an intermediate output line 20 through a semiconductor switch 22 to the output line 8. The switches 18 and 22 are also controlled by the switch control 14.

In operation, the circuit shown in FIG. 2 is effective to isolate each group of thermocouples and the leakage currents generated through their respective semiconductor switches. Thus, the selection of thermocouple 3 in the first group is effective to close the associated switch 3A which allows leakage currents from switches 1A and 2A to flow through the source impedance 16. However, leakage currents from the switches 4A, 5A and 6A associated with the second group of thermocouples 4, 5 and 6 are controlled by a concurrent closure of the shunt switch 7A which shunts the leakage currents from the switches 4A, 5A and 6A to the common ground connection. Concurrently, a switch 22 in the intermediate line 20 is opened while the switch 18 in the intermediate line 16 is closed. Consequently, the output from the selected thermocouple 3 is applied over intermediate line 16 to the input of the amplifier 10 while the outputs from the second group of thermocouples are isolated from the amplifier 10 and their associated leakage currents are shunted to ground. In this arrangement, the leakage currents through the selected source impedance 16 are only the leakage currents from the first and second switches 1A, 2A, e.g., 20 nanoamps. This 20 nanoamp, or 0.02 microamp leakage current, produces a 20 microvolt drop across the source impedance of 1000 ohms. Such a voltage drop can be represented by a 1.0° error in the measured temperature which is within an acceptable error range and substantially less than the 2.5° error produced by the conventional circuit shown in FIG. 1. Such an improved operation is effective to produce a usable multiplexer using solid-state switches.

In FIG. 3, there is shown a differential amplifier embodiment of the present invention. The leakage current shunting operation of the circuit shown in FIG. 3 is similar to that described above with respect to FIG. 2. The switch control has been omitted from FIG. 3 for the sake of clarity while the same reference numbers have been used in FIG. 3 for elements common to FIGS. 2 and 3. Additional leakage current control switches and intermediate output lines are necessary as a result of dual signal line circuitry used in FIG. 3.

Accordingly, it may be seen, that there has been provided, in accordance with the present invention, an improved multiplexer with leakage current control.

The embodiments of the present invention in which an exclusive property or privilege is claimed are defined as follows:

1. A signal multiplexer comprising
    a plurality of solid-state input switches arranged to be connected to respective input signal sources,
    circuit means for group said switches in a plurality of groups with each group having a plurality of said switches,
    a plurality of selectable leakage current shunting circuits,
    a plurality of leakage control switches with each of said control switches being arranged to connect a respective one of said groups to a respective one of said shunting circuits,
    multiplexer output means for receiving signals from a selected one of the sources in said groups and
    switch control means for concurrently operating said input switches to select one of the input signal sources and to select said control switches to connect all of the non-selected groups of said input switches to respective ones of said current shunting circuits.

2. A multiplexer as set forth in claim 1 wherein said control switches are solid-state switches.

3. A multiplexer as set forth in claim 1 wherein said output means includes a multiplexer output line, a plurality of intermediate output lines connecting respective ones of each of said groups to said output line and a plurality of output switches with each of said output switches being arranged in series with a respective one of said intermediate output lines.

4. A multiplexer as set forth in claim 3 wherein said control and output switches are solid-state switches.

5. A multiplexer as set forth in claim 4 wherein said switch control means is arranged to operate said output switches to connect one of said intermediate output lines to said output line and to a group of said input switches having a selected one of said input switches.

6. A multiplexer as set forth in claim 5 wherein said output switches are operated concurrently with said input switches and said control switches.

* * * * *